United States Patent [19]

Logan et al.

[11] E Patent Number: Re. 31,862

[45] Reissued Date of Patent: Apr. 9, 1985

[54] APPARATUS FOR THE TREATMENT OF LIGNOCELLULOSIC MATERIAL

[75] Inventors: Kenneth C. Logan, Jakarta, Indonesia; Friedrich O. B. Ludhe, Bethesda, Md.

[73] Assignee: Sunds Defibrator, Inc., Minn.

[21] Appl. No.: 477,842

[22] Filed: Mar. 22, 1983

Related U.S. Patent Documents

Reissue of:

[64] Patent No.: 3,948,449
Issued: Apr. 6, 1976
Appl. No.: 465,056
Filed: Apr. 29, 1974

U.S. Applications:

[60] Division of Ser. No. 231,694, Mar. 3, 1972, Pat. No. 3,808,090, which is a continuation-in-part of Ser. No. 77,374, Oct. 1, 1970, abandoned, which is a continuation of Ser. No. 888,728, Dec. 29, 1969, abandoned, which is a continuation-in-part of Ser. No. 704,497, Dec. 14, 1967, abandoned, which is a continuation-in-part of Ser. No. 569,351, Aug. 1, 1966, abandoned, which is a continuation-in-part of Ser. No. 357,008, Mar. 25, 1964, abandoned, which is a continuation-in-part of Ser. No. 159,329, Dec. 14, 1961, abandoned.

[51] Int. Cl.[3] ..... B02C 23/24

[52] U.S. Cl. ..... 241/41; 241/28; 241/65; 241/248; 241/280; 241/DIG. 14

[58] Field of Search ..... 241/245, 278 R, 57, 241/244, 248, 280, 41, 65, 24, 28, 261.2, 261.3, DIG. 14

[56] References Cited

U.S. PATENT DOCUMENTS

| | | | |
|---|---|---|---|
| Re. 29,922 | 2/1979 | Sampson . | |
| 1,795,603 | 3/1931 | Hussey | 241/28 X |
| 2,008,892 | 7/1935 | Asplund | 162/23 X |
| 2,047,170 | 7/1936 | Asplund . | |
| 2,323,194 | 6/1943 | Beveridge et al. . | |
| 2,396,587 | 3/1946 | Lowgren et al. | 241/65 X |
| 2,425,024 | 8/1947 | Beveridge et al. . | |
| 2,454,532 | 11/1948 | Walter . | |
| 2,454,533 | 11/1948 | Walter . | |
| 2,591,106 | 4/1952 | Sutherland . | |
| 2,657,131 | 10/1953 | Messing | 241/245 X |
| 2,947,655 | 8/1960 | Eberhardt . | |
| 3,013,931 | 12/1961 | Wethern et al. . | |
| 3,057,769 | 10/1962 | Sandberg . | |
| 3,076,610 | 2/1963 | Rosenfeld et al. | 241/28 |
| 3,092,338 | 6/1963 | Reinhall . | |
| 3,106,324 | 1/1962 | Textor . | |
| 3,215,355 | 11/1965 | Shouvlin et al. . | |
| 3,372,879 | 3/1968 | Jones et al. | 241/24 |
| 3,411,720 | 11/1968 | Jones et al. | 241/24 |
| 3,661,328 | 5/1972 | Leask | 241/28 X |
| 3,773,610 | 11/1973 | Shouvlin et al. | 241/28 |
| 3,808,090 | 4/1974 | Logan et al. | 241/28 X |

OTHER PUBLICATIONS

*Defibrator Method and Its Applications,* Asplund, 11-1939.

*Defibrator Method and Its Applications,* Asplund, 12-1939.

*World's Largest Pulp Refiner-What? Why? and How?,* Rastatter et al., Paper Trade Journal, Sep. 18, 1971.

*Refining Low Energy, High Production Groundwood with a Double Disk Refiner,* Montmorency, Pulp and Paper Magazine of Canada, 1-1958.

*Primary Examiner*—Mark Rosenbaum

*Attorney, Agent, or Firm*—Lerner, David, Littenberg, Krumholz & Mentlik

[57] ABSTRACT

The invention relates to the production of a wholly mechanical pulp of improved strength properties. The lignocellulosic material is fed into a substantially closed chamber where it is mechanically abraded under a power input of fifteen or more horsepower days per ton. During the abrading step, the material is maintained in an inert gaseous atmosphere of a pressure of ten to eighty psig, preferably twenty to forty psig.

3 Claims, 9 Drawing Figures

APPARATUS FOR THE TREATMENT OF LIGNOCELLULOSIC MATERIAL

Figure 8:
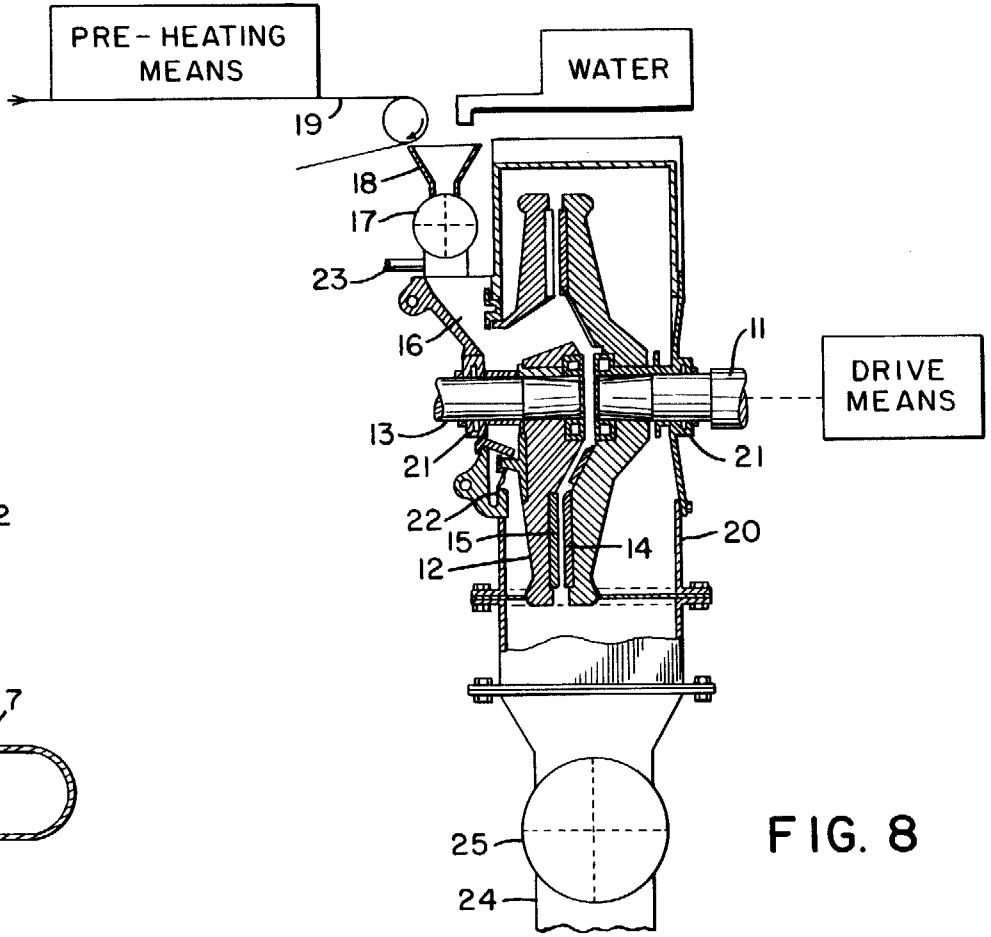

Matter enclosed in heavy brackets [ ] appears in the original patent but forms no part of this reissue specification; matter printed in italics indicates the additions made by reissue.

RELATED APPLICATIONS

This application is a divison of application Ser. No. 231,694, filed Mar. 3, 1972, now U.S. Pat. No. 3,808,090, granted Apr. 30, 1974, which is a continuation-in-part of application Ser. No. 77,374, filed Oct. 1, 1970, now abandoned, which is a [continuation-in-part] *continuation* of application Ser. No. 888,728, filed Dec. 29, 1969 and now abandoned and which, in turn, was a continuation-in-part of Ser. No. 704,497, filed Dec. 14, 1967, now abandoned and which was a continuation-in-part of Ser. No. 569,351, filed Aug. 1, 1966, now abandoned and which was a continuation-in-part of Ser. No. 357,008, filed on Mar. 25, 1964, now abandoned and which in turn, was a continuation-in-part of Ser. No. 159,329, filed Dec. 14, 1961 and now abandoned.

BACKGROUND OF THE INVENTION

In the manufacture of mechanical wood pulps, two basic procedures have heretofore been followed. In one case, wood logs are abraded to a pulp by pressing against a rotating abrasive wheel formed, for instance, of silicon carbide, in the presence of sufficient moisture to prevent decompsoition by excessive temperatures. In the other case, which is becoming of growing significance in the industry, there is employed a mechanical refining treatment wherein wood logs are first reduced to small chips which are subsequently fed between rotating discs set at small clearance and provided with abrading surfaces of suitable design to promote the refining action desired.

In this abrading process there is an input of power of about 75 to 130 H.P. days per ton and sufficient water is added to encase the wood particles and prevent discoloration which would result from "dry" abrading. The water also seems to act as a vehicle to dissipate local heat and to lubricate the mass so it flows and gives relative uniform treatment in the brading or refining action. All such installations have sufficient water added so that the consistency is below about 30 percent (230 percent water on dry basis of wood).

In the existing systems for the production of papermaking mechanical pulp, it is the practice to employ atmospheric pressure in the abrading operation. The feed of raw material and the recovery of the product is accomplished without provision for isolating the system or for controlling the system pressure during the abrading treatment.

In the Asplund process, well known in the industry for the manufacture of low grade pulps for employment in the manufacture of roofing and flooring felts the system involves generally a presteaming of wood chips followed by refining under high pressure. The products are not suitable for papermaking pulps because of their inherent low strength and other poor paper-making qualities. In the Asplund process, conditions are selected to provide a mechanical reduction of wood into fibers with least possible energy input. To this end, high pressures of the order of 115–150 psig and low energy input of the order of 7–12 horsepower days per ton are employed to attain best results. Asplund process plants have been in existence throughout the world for over twenty years. However, as previously indicated, these plants have not successfully produced papar grades.

In papermaking grades of mechanical pulp, the most widespread in use is stone groundwood which is produced by abrading logs with an abrasive stone, as previously indicated. Almost the entire world production of newsprint, for example, is manufactured from pulp in which stone groundwood is the principal component.

However, efforts have constantly been made to improve the strength of paper obtained from stone groundwood since it has always been necessary to include some chemical pulps with the groundwood in order to achieve adequate strength for most requirements. Chemical pulps are much more expensive than mechanical pulps because they are obtained in low yields (40–50 percent) from wood and involve extensive, costly processing techniques. Their production causes pollution of the environment. Consequently, it has been a logical objective of research in the paper industry to develop a mechanical wood pulp with sufficient strength and toughness to permit its use as the only fibrous raw material for paper manufacture. However, prior to the present invention, no economically feasible procedure for the production of such a pulp has thus far been developed.

One step towards achieving improved strength properties has been the development of disc refiners for processing wood chips into mechanical pulp. The equipment currently in use comprises conventional disc refiners operating at atmospheric pressure with unrestricted feed and discharge ports. Generally, the tear resistance (TAPPI method) of disc refiner pulps is about 50 percent greater than that of corresponding stone groundwood made from the same wood species. These disc refiner mechanical pulps are currently considered to be the strongest available for papermaking purposes.

SUMMARY OF THE INVENTION

The present invention seeks to provide a wholly mechanical wood pulp with sufficient strength to render it quite satisfactory for the manufacture of paper of acceptable quality.

In accordance with the invention, the lignocellulosic material is fiberized by mechanically abrading it in a closed chamber under a power input of at least 15 horsepower days per ton in the presence of a suitable quantity of water. During the entire abrading step, the material is maintained in an inert gaseous atmosphere of a pressure of 10 to 80 psig, preferably 20 to 40 psig.

Figure 1:
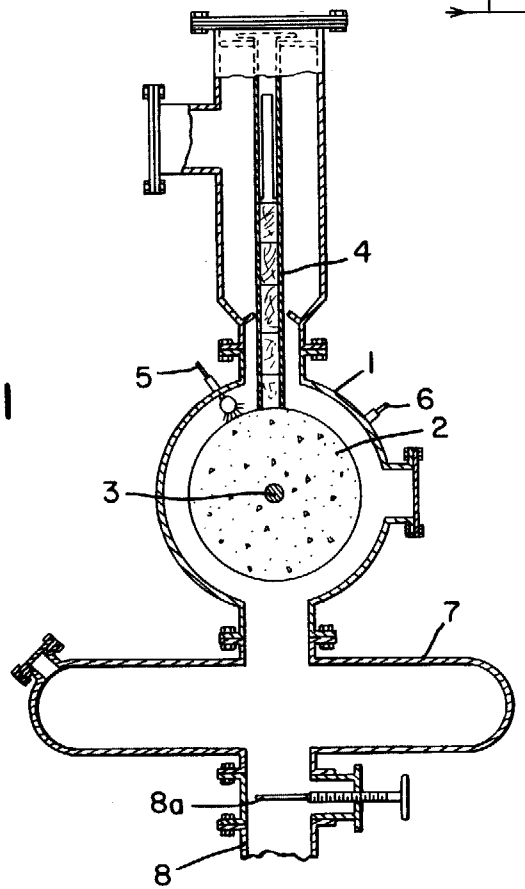

In the accompanying drawing:

FIG. 1 is an end elevation, partly in section, of a grinder which may be employed to carry out the method of the invention.

Figure 3:
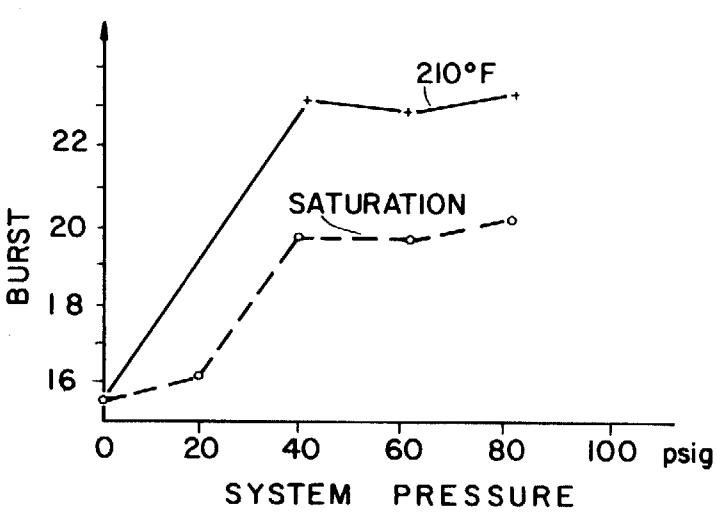
Figure 2:
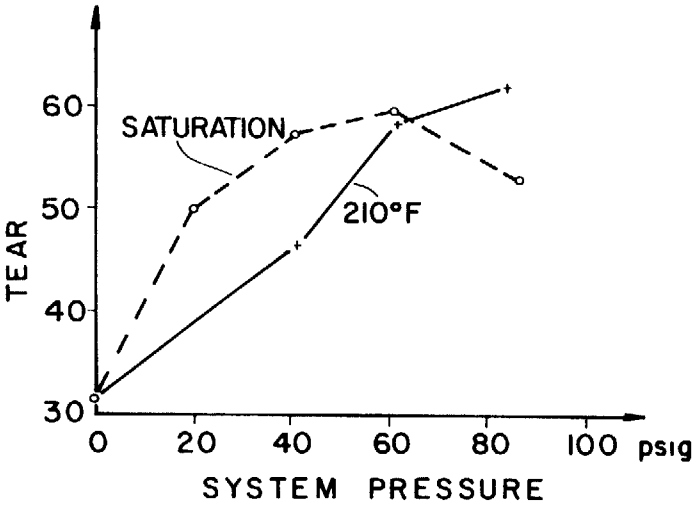
Figure 5:
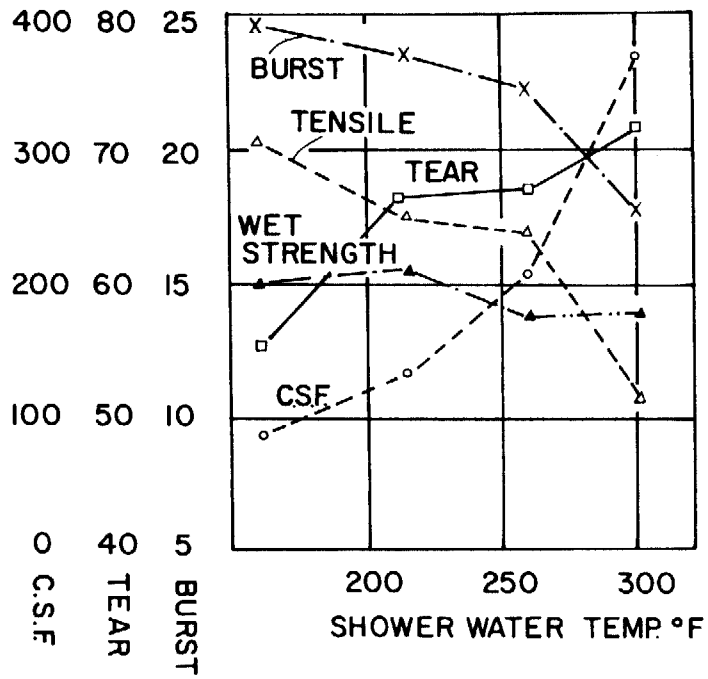
Figure 4:
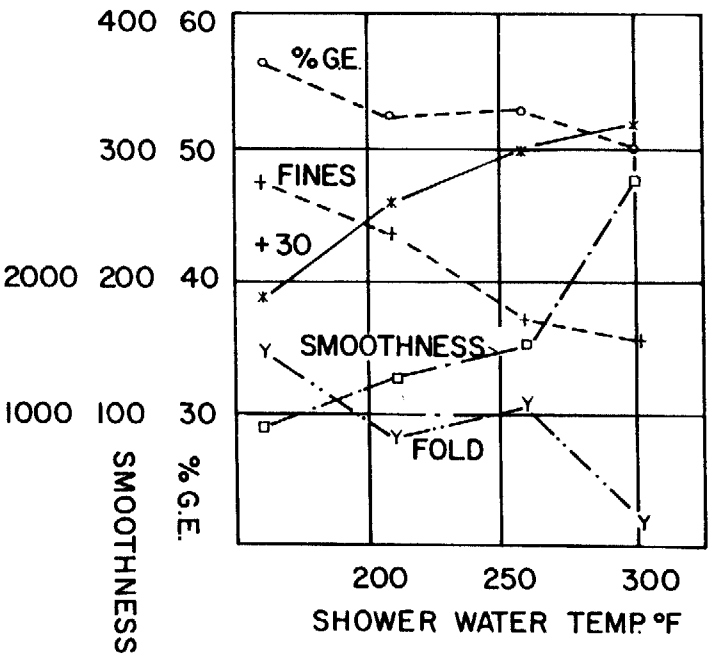
Figure 7:
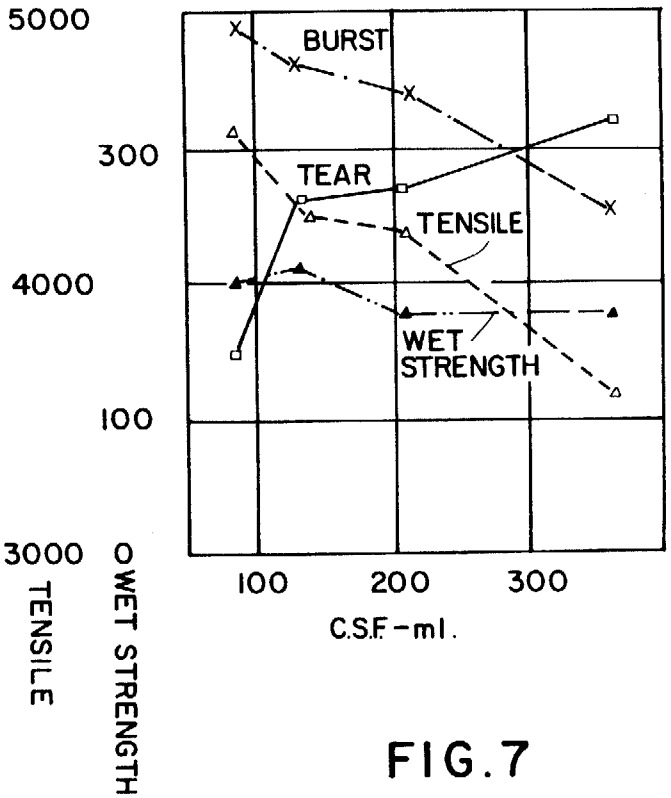
Figure 6:
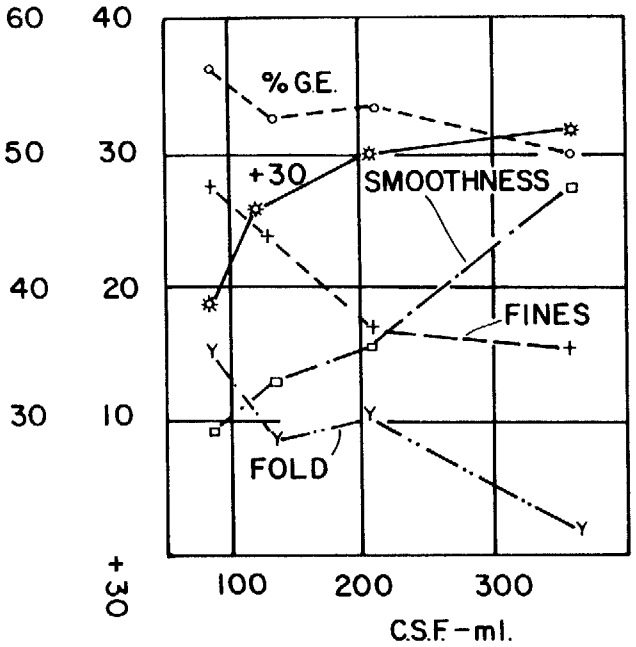
Figure 9:
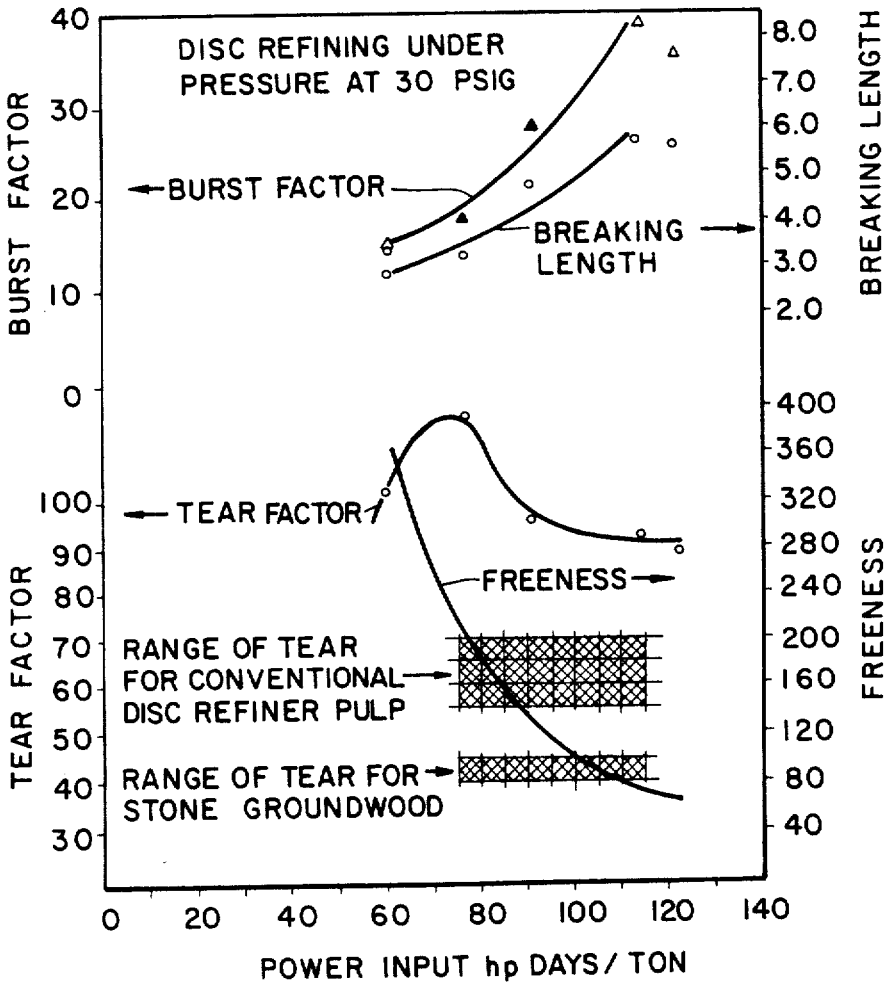

FIG. 2, is a graph showing the dependence of tear on pressure at different water temperatures, FIG. 3 is a graph showing the dependence of burst on pressure at different water temperatures, FIGS. 4, 5, 6 and 7 are graphs showing pulp and paper properties versus water temperatures and freeness, FIG. 8 is a side elevation, partly in section, of a disc refiner apparatus which may be employed to carry out the method of the invention, and FIG. 9 is a graph illustrating the significance of power input in relation to pulp properties.

Referring to FIG. 1, 1 is a closed vessel enclosing a grinding or abrasive wheel 2 mounted on a driven shaft 3. A magazine or feeding device 4 is adapted to feed the wood onto the surface of the wheel 2. Shower water is applied to the wood constantly during the treatment by means of pipes 5. An inlet for air, steam or other gas under pressure is indicated at 6. Stock is discharged from the interior of the vessel 1 to a collecting container 7 and thence through a pipe 8 having a valve 8a therein.

The grinder is operated in a pressurized atmosphere by supplying a pressure medium through inlet 6. Steam, air or other inert gas, such as argon or nitrogen, may be employed as the pressure medium.

Referring to FIG. 8, a refiner or basically conventional type is therein illustrated and comprises a rotating disc 10 mounted on a shaft 11, a stationary disc 12 carried by shaft 13, mating plates 14 and 15 carried by the discs, a chip feeding passage 16 for delivering chips between the plates 14 and 15, a chip feeding device 17 in passage 16, a chip receiving hopper 18 leading to the passage, and a conveyor 19 for supplying chips to the hopper.

In accordance with the invention, the refiner is fully enclosed in a casing 20, suitable seals as indicated at 21 and 22 being provided to make the casing substantially pressure tight.

The casing 20 and the enclosed refining elements are subjected to pressure of steam, air or other gas, through a connection 23 communicating with passage 16. A suitable quantity of water is fed into the casing with the chips. Stock is discharged from the casing through a conduit 24 provided with a valve 25.

The abrading operation in each case is conducted under a pressure, within the vessel 1 or casing 20, of 10 to 80 psig. Preferably, such pressure is maintained at about 30 psig and within the range 20 to 40 psig. The mechanical energy introduced to perform the abrading step is at least 15 hp. days/ton and may be in the range of 30 to 150 hp. days/ton.

The wood chips may be subjected to a preliminary heating before being fed to the refiner with beneficial results. Such preliminary heating is conducted at temperature of 50° to 100° C.

The following Table I gives the results of operational tests conducted using a grinder such as illustrated in FIG. 1.

TABLE I

| | | | | | | | | | |
|---|---|---|---|---|---|---|---|---|---|
| I. Independent Grinding Conditions | | | | | | | | | |
| (a) Constant Conditions: | | | | | | | | | |
| Specific Grinding Pressure | psi | 40 | | | | | | | |
| Shower Water Volume | USGPM | 2.4...2.7 | | | | | | | |
| Wood Moisture | % | 28.4 | | | | | | | |
| Wood Density | g/cc | 0.423 | | | | | | | |
| | | Test No. | | | | | | | |
| | | 1. | 2. | 3. | 4. | 5. | 6. | 7. | 8. |
| (b) Variable Conditions: | | | | | | | | | |
| Shower Water Temperature °F. | | 210 | 210 | 210 | 210 | 260 | 280 | 300 | 315 |
| Pressurizing Medium | | Atmos. | Air | Air | Air | Air | Air | Air | Air |
| System pressure psig | | 0 | 40 | 60 | 80 | 20 | 40 | 60 | 85 |
| II. Dependent Variables | | | | | | | | | |
| Travelling rate of wood micron/sec. | | 567 | 623 | 903 | 701 | 645 | 945 | 1030 | 1050 |
| Specific Power Consumption HP day/air dry ton | | 72.2 | 74.6 | 55.5 | 51.5 | 56.6 | 43.4 | 49.9 | 35.8 |
| Pulp Properties | | | | | | | | | |
| Bulk cc/g | | 2.15 | 2.17 | 2.31 | 2.39 | 2.34 | 2.43 | 2.48 | 2.50 |
| Brightness % G.E. | | 54.3 | 53.9 | 52.6 | 54.1 | 54.0 | 52.1 | 51.7 | 47.6 |
| Smoothness cc/min. | | 84 | 69 | 117 | 116 | 158 | 136 | 159 | 208 |
| Porosity sec/50 cc | | 42.4 | 76.9 | 32.0 | 33.0 | 38.4 | 24.3 | 22.8 | 16.2 |
| Freeness ml. | | 48 | 55 | 139 | 130 | 156 | 174 | 167 | 225 |
| Burst | | 15.6 | 23.0 | 20.7 | 23.0 | 15.8 | 19.6 | 19.6 | 20.1 |
| Tensile m | | 3450 | 4400 | 4050 | 4250 | 3350 | 3950 | 3700 | 3250 |
| Tear gcm/cm/ | | 31 | 47 | 59 | 61 | 50 | 58 | 62 | 54 |
| Fold n | | — | 1458 | 1310 | 1795 | 141 | 777 | 801 | 772 |
| Wet Web Strength W20 g/3cm | | 103 | 198 | 158 | 197 | 142 | 169 | 183 | 186 |
| Initial Solid Content % | | 100 | 156 | 104 | 148 | 109 | 118 | 126 | 133 |
| Initial Wet Web g/3cm | | 19.2 | 16.3 | 15.3 | 15.8 | 17.0 | 15.3 | 15.5 | 14.7 |
| Fibre Classification: | | | | | | | | | |
| Ret. 14 mesh % | | 0.1 | 0.2 | 1.1 | 0.5 | 0.5 | 0.4 | 0.9 | 1.8 |
| Ret. 30 Mesh % | | 6.5 | 16.3 | 24.8 | 23.9 | 16.1 | 24.7 | 26.5 | 32.4 |
| Ret. 50 Mesh % | | 9.2 | 13.8 | 17.3 | 16.4 | 14.4 | 15.3 | 16.0 | 16.0 |
| Ret. 100 Mesh % | | 14.4 | 15.0 | 14.4 | 14.7 | 15.8 | 13.6 | 13.8 | 12.8 |
| Fines (passing 100 Mesh) % | | 69.8 | 54.7 | 42.4 | 45.5 | 53.2 | 46.0 | 42.8 | 37.0 |
| Rejects % | | 0.8 | 2.9 | 2.3 | 3.0 | 2.1 | 6.5 | 7.2 | 5.5 |
| $H_2O$ —Sol. % | | 3.4 | 2.5 | 3.2 | 2.8 | 3.7 | 3.8 | 4.7 | 6.3 |
| Total Yield % | | 96.6 | 97.5 | 96.8 | 97.2 | 96.3 | 96.2 | 95.3 | 93.7 |

The advantages of operating a grinder at the elevated pressures set forth is clearly shown in the table. It will be observed that the pulps 2 and 3, for instance, prepared in the pressurized atmosphere required less energy, had higher freeness, and were produced at a greater rate than the pulp 1 which was prepared under conventional atmospheric conditions.

The classification of fiber sizes reveals that grinding in the pressurized atmosphere defined results in fewer fines and a larger increase in the fraction retained on the 30 mesh screen. Micrographs show that pulps 2 and 3 contain a predominance of long unbroken fibers such as are found in chemical pulps in contrast with the predominance of short broken fibers in conventional groundwood. As previously indicated, the pressure of many long fibers in pulp is desirable because they result in paper with high resistance to tearing.

The strength properties of handsheets prepared from the pulps described indicate that resistance to tearing is much greater in handsheets produced from pulps 2 and 3 while other properties such as burst, breaking length, folding endurance and initial wet web strength, are at levels which are higher than or only with very low freeness achieved by using conventional groundwood.

During grinding in the pressurized atmosphere described, it is desirable to supply the shower water at increased temperatures. It has been found that this temperature has relation to the properties of the resulting pulp and may be chosen in accordance with such properties.

FIGS. 2 and 3 illustrated the dependence of tear and burst on pressure at two shower water temperatures, namely; 210° F. and saturation temperature for the particular pressure employed.

Table II gives the results of tests conducted at a pressure of 60 psig and shower water temperatures of 160° F., 210° F., 260° F., and 300° F., all other conditions, including the wood samples, being identical. Properties of a conventional groundwood are included for comparison. These results are also plotted on the curves of FIGS. 4 to 7.

The results show:

1. The most desirable practical range of pressure is 10 to 30 psig.

TABLE II

| | EFFECT OF TEMPERATURE ON PRESSURIZED GRINDING | | | | CONVENTIONAL GROUNDWOOD |
|---|---|---|---|---|---|
| Shower Temperature* | 160°0 F. | 210° F. | 260° F. | 300° F. | |
| C.S.F.—ml | 89 | 132 | 208 | 364 | 115 |
| Burst—g/sq.cm. | 24.5 | 23.4 | 22.2 | 17.6 | 13.3 |
| Tensile—m | 4550 | 4250 | 4200 | 3600 | 3200 |
| Tear—cm.g/cm. | 55 | 66 | 67 | 72 | 45 |
| Folds (using 0.3 kg. load) | 1463 | 865 | 1065 | 193 | 115 |
| Wet strength—g | 200 | 210 | 176 | 175 | 108 |
| Bulk—cc/g | 2.24 | 2.37 | 2.45 | 2.69 | 2.56 |
| Brightness—% G.E. | 56.4 | 52.7 | 53.1 | 50.3 | 57.5 |
| Smoothness—ml/sec. | 97 | 129 | 156 | 274 | 152 |
| Porosity—Sec./50ml | 63.3 | 38.8 | 20.2 | 8.6 | 20.8 |
| Wood Solubles—% on o.d. wood | 1.6 | 2.8 | 3.0 | 3.9 | — |
| Screen—Rejects | 1.8 | 3.3 | 3.4 | 5.5 | 0 |
| Classification + 14 | 0.3 | 0.7 | 1.6 | 2.9 | 0.4 |
| + 30 | 18.9 | 25.8 | 29.7 | 31.7 | 10.8 |
| + 50 | 16.1 | 16.1 | 18.3 | 17.5 | 23.7 |
| + 100 | 17.1 | 14.3 | 13.6 | 12.6 | 10.4 |
| Fines | 47.6 | 43.4 | 36.8 | 35.3 | 54.9 |
| Wood Travel micro/sec. | 792 | 885 | 1105 | 1210 | 467 |
| Production Rate (Relative Value) | 40.7 | 45.7 | 57.0 | 62.6 | 23.8 |
| Power Consumption—HPD/ADT | 56.2 | 50.2 | 36.1 | 27.7 | 70.8 |

*Constant Test Conditions
60 psig (Air)—System pressure
40 psi—Specific grinding pressure
2.5 USGPM—Shower water flow
Spruce—Wood
0.396 g/cc—Wood density
33.6—Wood moisture 2. The power input is desirably not substantially less than 20 HP days/ton. A practical operating range is 15 to 80 HP days/ton but a range of 15 to 150 HP days/ton may be employed.

3. Increasing the shower water temperature from 160° F. to 300° F. increased the rate of wood travel and hence production by 53 percent. The average production of a Waterous Standard hydraulic magazine grinder is 23.8 air dry tons per day. At 160° F. the production in accordance with the invention is 71 percent greater than that of the grinder mentioned and at 300° F., it is 162 percent greater.

4. The tear property increases as the shower water temperature is increased, although other stock properties decrease. However, the pulp quality is best evaluated when compared to the pulp freeness (see FIGS. 6 and 7).

a. The freeness rose sharply from a minimum of 89 C.S.F. to a maximum of 364 C.S.F. This is further reflected in the increase in long fiber content (+30) and the decrease in fines content.

b. Bulk increases as the temperature increases. This is to be expected because of the increase in long fibers.

c. Smoothness decreases and porosity increases as the temperature increases. These effects are directly related to freeness increase. It will be observed that smoothness shows a linear increase as freeness increases.

d. While burst and tensile dropped as the temperature increased, when this is related to freeness, the decrease is found to be practically linear. This implies that the strength drop is only that which corresponds to the higher freeness. It will be noted that the burst and tensile values are at a very high level for all the pulps tested and these values are considerably higher than those of conventional groundwood at the same freeness. Thus, Burst = maximum 24.5, minimum 17.6

Tensile = maximum 4450, minimum 3600.

e. The tear value increased from 55 to 72 with the sharp rise at 210° F. This sharp rise becomes even more significant when related to freeness. The effect of temperature on tear is thus quite positive and most evident between 160° . to 210° F.

f. Fold value decreases somewhat with the temperature rise.

g. The wet stength is high in all cases as shown by the properties of the conventional groundwood. The change with temperature is believed to be related to the freeness of the stock.

h. The pulp brightness decreases as the shower temperature increases. The drop was 6.1% G.E. from 56.4% G.E.

5. The wood soluble portion increases from 1.6% at 160° F. to 3.9% at 300° F. and is lost from the process. The rejects increase from 1.8% at 160° F. to 5.5% at 300° F. These rejects consist of bundles of long fibers partially separated into individual fibers and consequently they could be readily recovered by a light refining.

Resistance to tear is particularly improved but other strength properties are also superior to those of conventional groundwood. Because of the large influence of freeness upon all properties, it is essential to take this factor into account when making comparisons.

Increasing shower water temperature generally enhances the effects of increased pressure and there is, therefore, the additional advantage that hotter shower water can be used at temperatures as high as correspond to saturation at the pressure employed.

In order further to demonstrate the advantages of the present invention, tests were conducted using a conventional two stage refining procedure with two "Bauer 480" refiners (3000 H.P. each) operating in series and a single stage pressurized refiner of the type described herein of 3000 H.P. Spruce and balsam chips (50/50) were the feed material and the power consumption in each case was about 70 H.P. days/ton. The results were:

| Type of Operation | Conventional 2-Stage | | | Pressurized Refining | |
|---|---|---|---|---|---|
| System pressure psig | | 0 | | 30 | |
| Stock freeness | 280 | 240 | 490 | 440 | 510 |
| Burst factor | 4.2 | 4.4 | 10 | 12 | 8.8 |

-continued

| Type of Operation | Conventional 2-Stage | | | Pressurized Refining | |
|---|---|---|---|---|---|
| Tear factor | 41 | 46 | 98 | 84 | 93 |
| Breaking Length, km | 1.19 | 1.9 | 2.4 | 2.5 | 2.3 |

It will be observed that the treatment in accordance with the invention produced a marked improvement in all strength properties as well as an increase in freeness. Normally, a higher freeness is associated with weaker pulp strength, but in the treatment in accordance with the invention, both strength and drainage characteristics are substantially and unexpectedly improved.

It has also been found that the addition of certain chemicals, as with the shower water, produces desirable results when used in conjunction with the process described. Useful chemicals in this regard may be generally defined as inorganic salts of sodium, calcium and magnesium. Examples of suitable compounds are, sodium bisulphite, sodium carbonate, sodium chloride, sodium sulphate, sodium sulphite, sodium hydrosulphite, sodium tetrapyrophate, sodium hexametaphosphate, sodium tri-polyphosphate, sodium hydroxide, zinc hydrosulphate, calcium chloride, magnesium chloride, and a chelating agent such as the pentasodium salt of diethylene-triamine-pentaacetic acid. Preferably, the compound added will be selected from the group sodium hydrosulphite, zinc hydrosulphite, sodium carbonate, sodium sulphite, and sodium hydroxide. The results of tests conducted with the addition of certain of these compounds with the shower water are given in the following table.

TABLE III

THE EFFECT OF CHEMICAL ADDITIONS ON PRESSURIZED GROUNDWOOD

| Grinding Variables | | | | | | | |
|---|---|---|---|---|---|---|---|
| Wood Density | 0.411 | g/cc | | | | | |
| Wood Moisture | 23.6 | % | | | | | |
| Shower Water Temperature | 295 | F | | | | | |
| System Pressure | 60 | p.s.i.g. | | | | | |
| Spec Grinding Pressure | 40 | p.s.i. | | | | | |
| CHEMICAL | — | $Na_2SO_3$ | $Na_2SO_3$ | $NaHSO_3$ | $Na_2S_2O_4$ | $Na_2CO_3$ | $Na_4P_2O_7$ |
| % on o.d. wood | — | 5 | 12 | 20 | 9 | 8 | 10 |
| Travelling rate micron/sec. | 1000 | 1025 | 911 | 936 | 1090 | 980 | 1020 |
| Production % (relative) | 100 | 103 | 91 | 94 | 109 | 98 | 102 |
| Spec. Power Cons. HP/day a.d.t. | 38.1 | 37.0 | 37.7 | 35.3 | 37.7 | 33.3 | 34.0 |
| Bulk—cc/g | 2.28 | 2.25 | 2.03 | 2.38 | 2.33 | 1.82 | 2.04 |
| Brightness—% G.E. | 51.0 | 50.5 | 49.8 | 53.4 | 55.0 | 38.3 | 46.6 |
| Smoothness—cc/min. | 121 | 88 | 56 | 103 | 114 | 47 | 53 |
| Porosity—s/50 c.c | 32.8 | 39.2 | 104.6 | 35.6 | 27.6 | 183.2 | 127.1 |
| Freeness—ml | 151 | 139 | 98 | 127 | 218 | 85 | 77 |
| Burst | 22.1 | 22.5 | 28.3 | 19.3 | 25.5 | 33.5 | 27.3 |
| Tensile—m | 4200 | 4600 | 5350 | 3850 | 4750 | 5800 | 5200 |
| Tear—gcm/cm | 58 | 59 | 54 | 60 | 64 | 54 | 51 |
| Fold—n | 1183 | 905 | 4429 | 835 | 2266 | 2573 | 2637 |
| Wet Web W20—g/s cm | 190 | 183 | 224 | 250 | 231 | 255 | 244 |
| Rejects—% | 12.1 | 8.6 | 9.1 | 6.3 | 7.3 | 9.9 | 5.9 |
| Ret. 14 mes—% | 0.7 | 1.6 | 0.8 | 1.1 | 2.6 | 0.9 | 0.8 |
| Ret. 30 mesh—% | 28.4 | 26.8 | 25.8 | 26.8 | 34.9 | 28.2 | 24.5 |
| Ret. 50 mesh—% | 16.0 | 14.6 | 17.2 | 14.9 | 19.5 | 15.0 | 14.4 |
| Ret. 100 mesh—% | 14.0 | 13.7 | 11.9 | 13.6 | 17.7 | 13.0 | 13.5 |
| Fines (Pass. 100 mesh)—% | 40.9 | 43.3 | 44.1 | 43.6 | 25.3 | 42.9 | 46.8 |
| Grinding Variables | | | | | | | |
| Wood Density | 0.418 | g/cc | | | | | |
| Wood Moisture | 35.9 | % | | | | | |
| Shower Water Temperature | 320 | F | | | | | |
| System Pressure | 90 | p.s.i.g. | | | | | |
| Spec Grinding Pressure | 40 | p.s.i. | | | | | |
| CHEMICAL | $CaCl_3$ | $MgCl_3$ | $Na_2SO_3$ | — | $Na_2S_2O_4$ | V80** 15% | $Na_2S_2O_4$ + 2% V80 |
| % on o.d. wood | 12 | 6 | 13 | — | 15 | 1.8 | — |
| Travelling rate micron/sec. | 910 | 1320 | 852 | 1410 | 1340 | 1505 | 1385 |
| Production % (relative) | 91 | 132 | 85 | 100 | 95 | 107 | 98 |
| Spec. Power Cons. HP/day a.d.t. | 42.0 | 30.9 | 50.7 | 31.9 | 35.1 | 26.9 | 35.1 |

TABLE III-continued

THE EFFECT OF CHEMICAL ADDITIONS ON PRESSURIZED GROUNDWOOD

| | | | | | | | |
|---|---|---|---|---|---|---|---|
| Bulk—cc/g | 2.32 | 2.38 | 2.14 | 2.42 | 2.28 | 2.68 | 2.52 |
| Brightness—% G.E. | 45.6 | 47.6 | 52.9 | 46.9 | 49.5 | 48.7 | 52.9 |
| Smoothness—cc/min. | 127 | 172 | 98 | 180 | 134 | 241 | 221 |
| Porosity—s/50 c.c. | 29.4 | 14.6 | 61.2 | 20.9 | 36.8 | 16.6 | 14.4 |
| Freeness—ml. | 167 | 280 | 119 | 205 | 151 | 230 | 300 |
| Burst | 22.1 | 19.4 | 21.9 | 20.9 | 22.2 | 22.8 | 21.9 |
| Tensile—m | 4000 | 3900 | 4850 | 3870 | 4230 | 3900 | 4210 |
| Tear—gcm/cm. | 63 | 64 | 56 | 72 | 64 | 72 | 72 |
| Fold—n | 923 | 370 | 1541 | 976 | 375 | 1068 | 662 |
| Wet Web W20—g/s cm. | 180 | 171 | 230 | 176 | 183 | 132 | 152 |
| Rejects—% | 4.6 | 5.6 | 1.8 | 6.9 | 6.1 | 8.1 | 12.9 |
| Ret. 14 mesh—% | 1.7 | 2.6 | 1.2 | 1.4 | 1.2 | 1.4 | 1.3 |
| Ret. 30 mesh—% | 29.4 | 31.3 | 26.4 | 30.4 | 28.5 | 28.5 | 31.8 |
| Ret. 50 mesh—% | 18.0 | 17.4 | 18.6 | 10.3 | 9.4 | 9.5 | 11.9 |
| Ret. 100 mesh—% | 12.3 | 13.6 | 15.2 | 14.0 | 14.7 | 14.7 | 14.9 |
| Fines (Pass. 100 mesh)—% | 38.6 | 34.8 | 38.6 | 43.9 | 46.2 | 45.9 | 40.1 |

*Trial performed at 180° F. shower water temperature
**V80 means Versenex 80 (Chelating agent)

It will be observed that strength properties are improved by addition of sodium sulphite, sodium hydrosulphite, sodium carbonate or sodium tetrapyrophosphate. Calcium chloride gives improved tear resistance as well as reduced screening rejects. The use of magnesium chloride results in a pulp of very high freeness and yet strength was retained. Sodium bisulphite gives some improvement in wet strength and also reduces screening rejects. The results shown in Table III also demonstrate that chelating agents, such as that known under the trade name Versenex 80 (aqueous solution of the pentasodium salt of diethylenetriaminepentaacetic acid) are useful for enhancing the improvement in brightness achieved with sodium hydrosulphite.

The compounds may be added either singly or in groups of two or more. The amount of chemical addition will depend to a large extent upon the particular compound employed and the particular lignocellulosic material used. Generally speaking, the amount of chemical addition will not substantially exceed 10 percent by weight of the lignocelluosic material. If a chelating agent is used, either by itself or in combination with another chemical addition, a very small percentage, say not exceeding 10 percent, gives beneficial results.

Further to illustrate the improvement achieved in pulp physical characteristics, tests were carried out by standard TAPPI methods used in the industry and the pulps were manufactured specifically for use in newsprint furnish. The results are shown in the following Table.

TABLE IV

| Pulp Properties Obtained from Spruce/Balsam wood | Conventional Stone Groundwood | Conventinal Disc Refiner Mechanical Pulp | Disc Refiner of present Invention |
|---|---|---|---|
| Freeness (Canadian Standard) | 100–110 | 150–200 | 150–200 |
| Tear Resistance | 40–45 | 55–70 | 80–95 |
| Burst Factor | 10–14 | 9–15 | 18–25 |
| Breaking length, km. | 3.5–4.5 | 2.0–3.5 | 4.0–5.0 |
| System Pressure | Atmospheric | Atmospheric | 30 psig |

The disc refiners used in carrying out the method for the present invention were the same as those used in the conventional disc refining (Bauer 480 Refiners) except that in practicing the present invention the refiner was modified by providing a suitable enclosure and feeding devices to permit operation under positive pressure in the manner heretofore described.

The limits of spacing between the disc is between 0.001 and 0.025 inch with a preferred spacing of about 0.007±0.003 inch. At greater spacing the chips will pass through too quickly so that they are insufficiently abraded and the energy input to the refiners falls off since there is not the work performed in abrading the wood to a fine pulp suitable for newsprint. As an extreme when the disc spacing exceeds the dimension of the chip practically no work is performed on the wood. The only load on the motor is the "idling load" which in the case of the 3000 H.P. unit specified amounted to approximately 100 H.P. This ratio of idling load to full "refining load" is substantially constant for commercial refiners. Thus, "total power consumption" as used in the present invention, refers to that horsepower actually applied to the wood chips. In performing the "work" in producing the papermaking pulp from wood in the refiner over 90 percent of the energy is converted into heat. In the "Asplund" and related processes a high temperature of about 170° C. is obtained. This is substantially above the "melting point" of the lignin which "flows" and coats the fibers which are formed so that further refining is difficult and that at this temperature pulps of low brightness result which are unsuited for newsprint and other papers. Because of the low energy consumption relatively little heat is generated. It is therefore necessary for Asplund to have a very low content of water in his process or these high temperatures would not be achieved. This is the reason for him providing in his process a press for squeezing out water from the naturally occurring water in wet chips.

In our process we add substantial quantities of water and also relieve the pressure so as to keep the temperature down. We provide no chamber to extend the retention time. This lower temperature and short retention time prevent the discoloration of the fibers and also permits the absorption of high quantities of energy in the refining step in order to produce a fine thoroughly defibered strong pulp suitable for newsprint and some other printing papers. It will be noted that in our experiments we added water to minimum of 2.4 U.S.G./min. This gave a quantity of water "suitable" to prevent the "burning" or loss of brightness which is a well recognized feature of the conventional grinding and also conventional refining process when consistencies rise too high. There is no known successful installation in the world in either conventional grinding or conventional refining to produce the groundwood type of fiber suitable for newsprint which does not add sufficient water to prevent this discoloration which occurs at low moisture content and high temperature. In every case there is sufficient water added to lower the consistency to 33 percent or in most cases below. In our experiments we always used enough energy in the refining to raise the temperature of the water (and thus pressure) to the required level when this suitable quantity of water was added. At these levels of energy consumption and with pressures relieved to levels specified the refiners produced pulp suitable for newsprint manufacture.

As in conventional processes the pulp is screened with the screened rejects being further refined. The screenings produced however, are much less than in conventional processes.

An earlier paragraph states that the only modification of the conventional groundwood refiners needed to practise this invention was their operation under pressure. There was about the same amount of water added as is required in operating conventional unpressurized refiners which produce paper grade mechanical pulp. The consistency of the conventional refiner pulp is in the range from 33 percent down to possibly 3 percent when producing acceptable pulp. The present invention utilizes the same range of consistencies. To achieve these consistencies, the water added together with the inherent moisture of the wood pulps will be from 200–3200 percent of the weight of the dry wood particles.

Table I shows that when operating the small pilot unit under pressure a minimum of 2.4 U.S.G.P.M. of water was added to the abrading system. This was sufficient to guarantee the wood and fiber always had "free" water to encase the fiber and prevent discoloration or "burning" of the fibers by overheating. The data in Table I (and FIG. 4) show that under conditions of the invention the brightness was maintained over 50 G.E. and when conditions were outside our specified range (85 lbs/sq. in the 315° F.) the brightness was unsatisfactory. In this case the high pressure prevented cooling of the mass by flashing to steam.

A further test was conducted using the large commercial refiners described above (3000 H.P.). In this case the refining was performed on two refiners in series using the same total horsepower per ton range as previously. The chips and water were both fed at predetermined rates Data was as follows:

| | |
|---|---|
| H.P. on pressurized refiner | 2800 H.P. |
| H.P. on second refiner | 2600 H.P. |
| Feed Rate of woods chips (dry) | 55 t/day |
| Water added to chips fed to pressurized refiner | 18 U.S.G.P.M. |
| Moisture in Wood Chips | 45–55% |
| Calculated water to dry wood chip ratio or consistency of | 2.95:1 25% |

A number of trial runs were made producing about 30 tons in each. This pressurized refiner mechanical pulp was run without addition of chemical pulp on a 238 inches wide paper machine running in excess of 2000 ft. per min. with an open draw. The newsprint produced was printed in a commercial newspaper pressroom. The newsprint was evaluated by both the letterpress and offset printing processes. It was satisfactory.

Tests on the pulp used in the newsprint trials were compared with a conventional furnish to the machine which was made up of a mixture of 72% conventional groundwood and 28% sulphite pulp of 47 percent yield

| | Conventional Furnish | Disc Refiner Pulp of Present Invention (no chemical pulp) |
|---|---|---|
| Freeness C.S. | 222 | 180 |
| Tear | 64 | 81 |
| Breaking Length | 4.2 | 3.9 |
| Bulk | 2.27 | 2.45 |
| Opacity | 93.3 | 97.1 |
| Brightness (Elrepho) | 61.3 | 59.6 |

The high tear was carried over into the finished newsprint. This is the most important physical test in determining runnability. Most of the increased opacity also was retained in the finished newsprint. These two favorable features will no doubt be employed to make a lighter weight newsprint sheet feasible with attendant ecological benefits in addition to those obtained from eliminating the use of chemical pulp.

The results shown in Table IV indicate a significant improvement in strength properties and particularly a marked increase in tear resistance which is of much importance in most papermaking and converting operations. Furthermore, these improvements were obtained at high freeness values which is an added advantage from the point of view of enhancing drainage on the paper machine with consequent better performance.

The significant effect of power input on properties is illustrated in FIG. 9, which shows the results of tests conducted on pulps produced in disc refining equipment in accordance with the invention.

These results demonstrate two significant features:

Firstly, a remarkable improvement in pulp strength, and particularly in tear resistance, is achieved over the entire range of power input. The strength properties not only approach those of chemical pulps but are superior in some cases. Thus, they represent aa significant advance in the technology of manufacture of mechanical pulps.

Secondly, useful pulps were obtained over the entire range of power inputs, although for different purposes. The coarser pulps produced at low energy input were of a type very suitable for the manufacture of paperboard of excellent strength. The intermediate pulps were especially suited for newsprint while those produced with high energy were of a kind suited for finer groundwood grades such as newsprint for rotogravure printing. In all cases, strength properties appear to surpass those of any mechanical pulps currently known in the field.

As previously indicated, a preferable positive pressure under which the disc refining operation of the present invention is carried out is about 30 psig. It appears that the beneficial effect arises from the higher temperatures attainable under pressure but it is not clear precisely what the reasons are. The exact pressure may, of course, be varied within the limits of the invention as indicated in Table V, which illustrates the results of tests conducted in accordance with the disc refiner treatment of the present invention.

TABLE V

Pulp Strength Data With Disc Refining Under Positive Pressure

| | | | |
|---|---|---|---|
| System pressure, psig | 16 | 30 | 50 |
| Power input hp days:ton | 60 | 60 | 60 |

TABLE V-continued

| Pulp Strength Data With Disc Refining Under Positive Pressure | | | |
|---|---|---|---|
| Pulp Properties | | | |
| Freeness Canadian Standard | 410 | 566 | 650 |
| Tear Factor | 90 | 138 | 105 |
| Burst Factor | 11 | 11 | 6 |
| Breaking Length, km | 2.8 | 3.4 | 1.9 |

These results show that a system pressure of 30 psig gave the best pulp strength and that at 15 psig and 50 psig there was some deterioration of quality. However, all results are superior to conventional pulps so that the entire pressure range may be considered useful.

As previously indicated, the optimum conditions for practice of the well known Asplund system are a pressure of above 100 psig and a power input of 7–12 hp days/ton. It has been found that these conditions are quite unsuitable for producing papermaking pulps because of inadequate pulp strength and severe discoloration of the product. The results herein set forth demonstrate that, for the production of papermaking pulps, it is necessary to provide sufficient energy (at least 15 hp days/ton) under a pressure of 10 to 80 psig for developing adequate pulp strength.

What is claimed is:

[1. Apparatus for producing a pulp having a brightness of at least 50% G.E. and a Canadian Standard Freeness not exceeding 510cc. which includes abrading means for mechanically abrading lignocellulosic fibrous particles, means for feeding a body of wood particles to said abrading means, and means for feeding a substantial quantity of water to said abrading means separate from the moisture naturally present in the wood particles so that it together with moisture in the chips amounts to at least 200 percent of the weight of the dry wood particles and is sufficient to encase the fibers to prevent discoloration due to excessive heating trauma, drive means for operating said abrading means to produce a final product with a total consumption of 30–150 horsepower days per ton of said final product, sealed housing means for subjecting said wood particles during said abrading to an environmental pressure of 10–60 psig and a temperature of 160° F. to 300° F. and means for supplying an inert gaseous atmosphere to said housing means.]

2. Apparatus for producing a paper making pulp comprised of a predominance of long unbroken fibers and having a brightness in excess of 50 G.E. and a Canadian Standard Freeness not exceeding [510 c.c.] *364 c.c.* comprising abrading means, housing means surrounding said abrading means for maintaining said abrading means in a pressurized environment, supply means for feeding lignocellulosic fibrous particles to said abrading means and means for supplying a substantial quantity of liquid water to said abrading means while maintaining a pressurized environment in said housing, discharge means for removing the fibrous end product from said housing means while maintaining a pressurized environment inside of the housing means, drive means for operating said abrading means with a minimum total power consumption of 30 horsepower days per ton of fibrous end product and means for supplying a pressure medium to said housing means.

3. Apparatus as set forth in claim 2 further comprising means for preheating said fibrous particles prior to introduction into said abrading means.

* * * * *